United States Patent [19]

Berman et al.

[11] Patent Number: 4,528,359

[45] Date of Patent: Jul. 9, 1985

[54] ADDUCTS OF EPOXY RESINS AND AMINO-SUBSTITUTED AROMATIC SULFONIC ACID AMIDES

[75] Inventors: Jody R. Berman; James L. Bertram, both of Lake Jackson; Ross C. Whiteside, Jr., Angleton, all of Tex.

[73] Assignee: The Dow Chemical Company, Midland, Mich.

[21] Appl. No.: 610,896

[22] Filed: May 16, 1984

[51] Int. Cl.³ ................... C08G 59/54; C08G 59/44
[52] U.S. Cl. ..................... 528/109; 525/504; 528/98; 528/99; 528/103; 528/361; 528/391
[58] Field of Search ............. 528/109, 98, 99, 361, 528/391, 103; 525/504

[56] References Cited

U.S. PATENT DOCUMENTS

| | | | |
|---|---|---|---|
| 2,633,458 | 3/1953 | Shokal | 528/109 X |
| 2,712,001 | 6/1955 | Greenlee | 528/109 X |
| 3,277,050 | 10/1966 | Pettigrew | 260/47 |
| 3,591,556 | 7/1971 | Godfrey et al. | 260/47 |
| 3,899,546 | 8/1975 | Stoy et al. | 260/834 |

*Primary Examiner*—Earl A. Nielsen
*Attorney, Agent, or Firm*—J. Q. Carter

[57] ABSTRACT

Resin compositions are prepared by reacting an epoxy resin with an amine-substituted aromatic sulfonic acid amide at a temperature up to about 130° C. The resultant product can be cured by heating to a temperature of at least about 150° C. in the presence of suitable curing agents and in some instances in the absence of any curing agent.

32 Claims, No Drawings

ADDUCTS OF EPOXY RESINS AND AMINO-SUBSTITUTED AROMATIC SULFONIC ACID AMIDES

BACKGROUND OF THE INVENTION

The present invention pertains to latent, self-curing epoxy resin compositions.

Amine-substituted aromatic sulfonic acid amides disclosed by Pettigrew in U.S. Pat. No. 3,277,050 to be suitable curing agents for epoxy resins. Godfrey and Schulze in U.S. Pat. No. 3,591,556 disclose the curing of epoxy resins with a combination of sulfonamides and polyoxyalkylene polyamines. Stoy and Roth in U.S. Pat. No. 3,899,546 disclose compositions which comprise (A) an interpolymer of an aldehyde and amine substituted aromatic sulfonic acid amide, (B) an epoxy resin and (C) a curing agent.

Because of the poor solubility of the sulfonamides employed in the aforementioned patents, coating formulations and the like requiring high solids content and relatively low application vicosities at low temperatures are not practical. The present invention provides a method for employing such sulfonamides as curing agents by prereacting, without curing to a thermoset condition, the sulfonamide with an epoxy resin thereby producing a latent self-curing epoxy resin which is capable of being employed in high solids applications with suitable viscosities at low temperatures. Curing, however, is accomplished at a relatively high temperature.

SUMMARY OF THE INVENTION

One aspect of the present invention pertains to resin compositions resulting from heating, at a temperature which is sufficient to cause primarily a reaction between the epoxy groups and the primary aromatic amine groups, but insufficient to cause a significant reaction between the epoxy groups and the sulfonamide groups, preferably not greater than about 130° C., most preferably not greater than about 120° C. for a time sufficient to complete the reaction between the aromatic amine groups and the epoxy groups, a composition comprising (A) at least one epoxy resin having an average of more than one 1,2-epoxy groups per molecule and (B) at least one amine substituted aromatic sulfonic acid amide; wherein components (A) and (B) are employed in quantities which provide at least about 0.2, preferably from about 0.3 to about 20, 1,2-epoxy groups for each primary aromatic amine group.

Another aspect of the present invention pertains to a resin composition containing excess epoxy groups with respect to amine hydrogen atoms resulting from heating, at a temperature which is sufficient to cause primarily a reaction between the epoxy groups and the primary aromatic amine groups, but insufficient to cause a significant reaction between the epoxy groups and the amide groups, preferably not greater than about 130° C., most preferably not greater than about 120° C. for a time sufficient to complete the reaction between the aromatic amine groups and the epoxy groups, a composition comprising (A) at least one epoxy resin having an average of more than one 1,2-epoxy groups per molecule and (B) at least one amine substituted aromatic sulfonic acid amide; wherein components (A) and (B) are employed in quantities which provide greater than about 4, preferably from about 6 to less than about 20, most preferably from about 8 to about 16, 1,2-epoxy groups for each primary aromatic amine group.

Excess epoxy groups with respect to amine hydrogen atoms is calculated by the formula Excess Epoxy Groups =

$$\left( \frac{\text{Wt. of Epoxy Resin}}{EEW \text{ of Epoxy Resin}} \right) - \left( \frac{\text{Wt. of Amine Hardener}}{\text{Amine hydrogen equivalent weight of amine hardener}} \right)$$

Another aspect of the present invention pertains to an article resulting from subjecting a composition comprising a mixture of the composition containing excess epoxy groups and a curing quantity of at least one curing agent therefor to curing conditions.

Another aspect of the present invention pertains to a latent, self-curing epoxy resin resulting from heating, at a temperature which is sufficient to cause primarily a reaction between the epoxy groups and the primary aromatic amine groups, but insufficient to cause a significant reaction between the epoxy groups and the sulfonamide groups, of up to about 130° C., preferably not greater than about 120° C. for a time sufficient to complete the reaction between the aromatic amine groups and the epoxy groups, a composition comprising (A) at least one epoxy resin having an average of more than one 1,2-epoxy groups per molecule and (B) at least one amine substituted aromatic sulfonic acid amide; wherein components (A) and (B) are employed in quantities which provides from about 2.5 to about 6, preferably from about 3 to about 5 1,2-epoxy groups for each primary aromatic amine group.

Another aspect of the present invention pertains to an article resulting from subjecting a composition containing the aforementioned latent, self-curing composition to a temperature of at least about 150° C., preferably from about 150° C. to about 250° C., most preferably from about 175° C. to about 225° C. for a time sufficient to complete curing thereof.

Another aspect of the present invention pertains to a resin composition containing excess hydrogen atoms attached to a nitrogen atom with respect to epoxy groups resulting from heating, at a temperature which is sufficient to cause primarily a reaction between the epoxy groups and the primary aromatic amine groups, but insufficient to cause a significant reaction between the epoxy groups and the amide groups, preferably not greater than about 130° C., most preferably not greater than 120° C. for a time sufficient to complete the reaction between the aromatic amine groups and the epoxy groups. In some instances, it may be necessary to go to higher temperatures to obtain a homogenous reaction mixture. A composition comprising (A) at least one epoxy resin having an average of more than one 1,2-epoxy groups per molecule and (B) at least one amine substituted aromatic sulfonic acid amide; wherein components (A) and (B) are employed in quantities which provide from about 0.2 to less than about 4, preferably from about 0.3 to about 1.9 or from about 2.1 to about 3.5, 1,2-epoxy groups for each primary aromatic amine group.

Excess amine hydrogen atoms with respect to epoxy groups is calculated by the formula

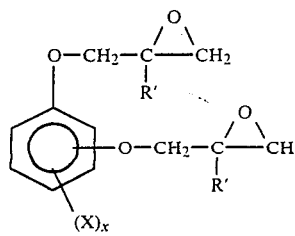

FORMULA I

Particularly suitable epoxy resins include the glycidyl ethers represented by the formulas

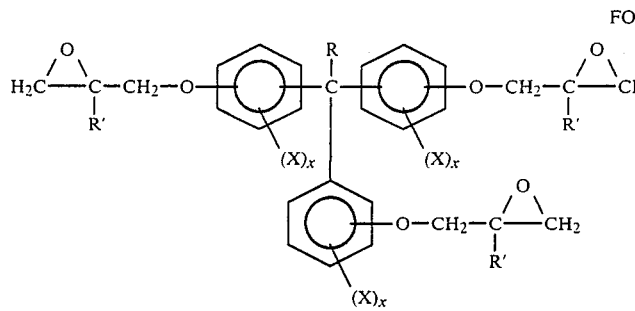

FORMULA II

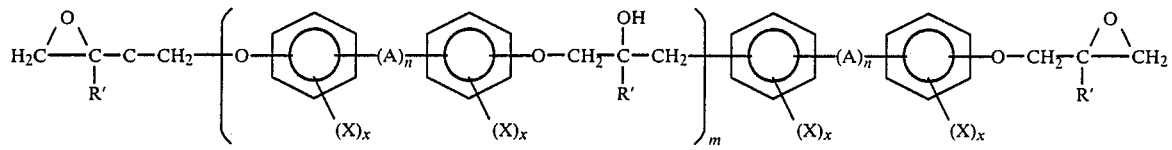

FORMULA III

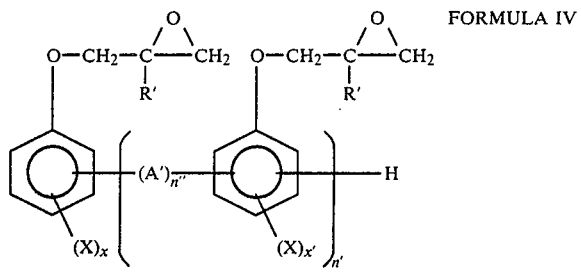

FORMULA IV

Excess Amine Hydrogen Atoms =

$$\left( \frac{\text{Wt. of Amine Hardener}}{\text{Amine Hydrogen Equivalent Wt. of Amine Hardener}} \right) - \left( \frac{\text{Wt. of Epoxy Resin}}{EEW \text{ of Epoxy Resin}} \right)$$

Another aspect of the present invention pertains to an article resulting from subjecting a composition comprising (I) the aforesaid resin composition containing an excess of amine hydrogen atoms with respect to epoxy groups; and (II) a sufficient quantity of at least one epoxy resin having an average of more than one 1,2-epoxy group per molecule so as to provide a ratio of epoxy groups contained in component II to amine hydrogen atoms contained in component I of from about 0.5:1 to about 2:1, to a temperature of at least about 150° C., preferably from about 150° C. to about 250° C., most preferably from about 175° C. to about 225° C. for a time sufficient to complete curing thereof.

The term primary aromatic amine group means an —NH$_2$ group attached to an aromatic ring.

DETAILED DESCRIPTION OF THE INVENTION

Suitable epoxy resin which can be employed herein include, for example, the glycidyl ethers of compounds containing an average of more than one aliphatic or aromatic hydroxyl group per molecule or the glycidyl esters of those compounds having an average of more than one carboxylic acid group per molecule or the equivalent thereof.

wherein each A is independently a divalent hydrocarbyl group having from 1 to about 10 carbon atoms,

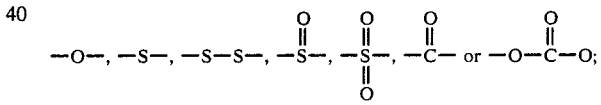

each A' is independently a divalent hydrocarbyl group having from 1 to about 10 carbon atoms; R is hydrogen or a hydrocarbyl group having from 1 to about 10 carbon atoms; each R' is independently hydrogen or a hydrocarbyl group having from 1 to about 4 carbon atoms; each X is independently hydrogen, or a monovalent hydrocarbyl group having from 1 to about 10 carbon atoms, or a halogen; m has an average value of from about zero to about 4, preferably from about zero to about 2; n has a value of zero or 1; n' has a value of from about 1.01 to about 7, preferably from about 1.01 to about 4; n'' has a value of from about one to about 4; x has a value of from one to about 4 and x' has a value of from one to about 3.

In the preparation of the latent self-curing epoxy resins or the resin composition containing an excess of amide groups, when the epoxy resin has an average of greater than two epoxy groups per molecule, it must be blended with an epoxy resin having an average of not more than about 2 epoxy groups per molecule in quantities such that at least about 25, perferably from about 50 to about 75 percent of the epoxy groups are derived from the epoxy resin(s) having an average of not more than about two epoxy groups per molecule.

Suitable amine substituted aromatic sulfonic acid amides which can be employed herein include, for example, those represented by the formula

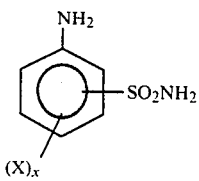

FORMULA V wherein X and x are as defined above.

If desired, curing of the latent self-curing compositions can be achieved in the presence of accelerators and/or cocatalysts such as, for example, tertiary amines, imidazoles, phosphonium compounds, ammonium compounds, sulfonium compounds, mixtures thereof and the like.

Suitable tertiary amines include, for example, triethylenediamine, N-methylmorpholine, triethylamine, tributylamine, benzyldimethylamine, tris(dimethylaminomethyl)phenol, mixtures thereof and the like.

Suitable imidazoles include, for example, 2-methylimidazole, 1-propylimidazole, mixtures thereof and the like.

Suitable phosphonium compounds include, for example, those disclosed by Dante et al in U.S. Pat. No. 3,477,990, Perry in Canadian Pat. No. 893,191 and U.S. Pat. No. 3,948,855 and by Tyler, Jr. et al in U.S. Pat. No. 4,366,295 all of which are incorporated herein by reference.

Suitable quaternary ammonium compounds include, for example, benzyl trimethyl ammonium chloride, benzyl trimethyl ammonium hydroxide, tetrabutyl ammonium chloride, tetrabutyl ammonium hydroxide, mixtures thereof.

If desired, the resin compositions of the present invention which contain excess epoxy groups can be cured in the presence of any of the well known epoxy resin curing agents such as, for example, primary amines, secondary amines, tertiary amines, carboxylic acids, carboxylic acid anhydrides, Lewis acids, mixtures thereof and the like. Most of these curing agents as well as others are disclosed in HANDBOOK OF EPOXY RESINS by Lee and Neville, McGraw-Hill, 1967 which is incorporated herein by reference.

They can be blended, prior to curing and if so desired with other components such as, accelerators, curing agents, pigments, fillers, dyes, flow control agents, solvents rubber modifiers, combinations thereof and the like. Also, reinforcing materials such as fibers, filaments, woven cloth mats and the like prepared from various materials such as figerglass, graphite, nylon, rayon and the like can be employed.

The resins of the present invention can be employed in varous applications such as, for example, coatings, castings, moldings, structural or electrical laminates or composites and the like. They are particularly useful in applications requiring high solids formulations, quick gel times, high Tg or fair toughness, or in some instances improved moisture resistance.

The following examples are illustrative of the invention but are not to be construed as to limiting the scope thereof in any manner.

EXAMPLE 1

In a 500 ml 3-neck, round bottom flask was charged 295.4 g (1.571 epoxy eq.) of a diglycidyl ether of bisphenol A having an average epoxide equivalent weight (EEW) of 188 and 54.62 g (1.27 eq. of total amine hydrogens) of sulfanilamide (average total amine plus sulfonamide hydrogen equivalent weight, TAHEW of 43) (average aromatic amine hydrogen equivalent weight, AAHEW of 86). The ratio of epoxy groups to primary aromatic amine groups was 4.94:1. The flask was equipped with a means for stirring, temperature control and nitrogen purge. The heat was turned on and stirring was started simultaneously, and after 30 minutes (1800 s), the temperature was controlled at 120° C. (time 0). After three hours (10,800 s), the resin was poured onto foil and allowed to solidify. The solid resin was transparent, gold and non-tacky. The resin was analyzed for percent epoxide by the pyridine method and found to be 11.6%. Cone and plate viscosity at 150° C. was 370 cp. The solid resin maintained these properties over 6 weeks U.S. Pat. No. (3,628,800 s). The resin was catalyzed with 0.1 phr benzyl dimethyl amine (BDMA) and found to gel at 190 sec. (175° C. test temperature). The resin was cured for 2 hours (7200 s) at 175° C. and tested on a differential scanning calorimeter (DSC). The Tg was 165° C.

EXAMPLE 2

A. Using the same procedure as Example 1, sulfanilamide was reacted with a 50:50 blend of a triglycidylether of trishydroxyphenyl methane having an average EEW of 162 (150.5 g, 0.9290 equiv.) and a diglycidyl ether of bisphenol A having an average EEW of 188 (150.08 g, 0.7983 equiv.) and 59.5 g sulfanilamide were charged into the flask. After advancement procedure was completed 3 hours (9,000 s), the resin was poured onto aluminum foil and analyzed. The final product was orange-gold, transparent and a non-tacky solid at room temperature. The percent epoxide by the pyridine method was 14.2% (12.4% epoxide theory), the viscosity at 150° C. was 520 cp, the gel time was (a) >10 minutes @ 178° C. without catalyst, (b) 25 seconds @ 178° C. with 0.5 phr BDMA, (c) 90 seconds @ 178° C. with 0.1 phr BDMA and (d) 210 seconds @ 150° C. with 0.1 phr BDMA. The Tg was (a) 158° C. uncatalyzed and cured at 250° C. for 2 hours (7200 s), (b) 90° C. uncatalyzed and cured at 200° C. for 2 hours (7200 s), (c) >260° C. catalyzed with 0.1 phr BDMA cured at 250° C. for 2 hours (7200 s), (d) 250° C. catalyzed with 0.1 phr BDMA cured at 200° C. for 2 hours (7200 s).

B. Running the same experiment only allowing the resin solution to advance at 120° C. for 4 hours (14,400 s), the final percent epoxide was 12.7 (12.4 theory). The viscosity of this resin @ 150° C. was 2500 cp. The cured products had properties similar to A above.

EXAMPLE 3

150 g (0.843 epoxy equiv.) of a phenolformaldehyde epoxy novolac having an average EEW of 178, 150 g (0.798 epoxy equiv.) of a diglycidyl ether of bisphenol A having an average EEW of 188 and 56.1 g (0.326 primary aromatic amine equiv.) of sulfanilamide were charged into 500 ml, 3-neck flask. The ratio of epoxy groups to primary aromatic amine groups was 5.03:1. The resin was advanced as in Example 1 and analyzed. The final product was a gold, transparent and non-tacky solid at room temperature, the viscosity @ 150° C. was 900 cp, the percent epoxide by pyridine method was 12.19 (353 EEW), the gel time was 210 sec. @ 150° C. with 1 phr BDMA, and the Tg was 185° C.

EXAMPLE 4

Using the same procedure as in Example 1, an advanced resin was prepared by reacting 313 g of a diglycidyl ether of bisphenol A (1.665 epoxy eq., 188 EEW) with 87.1 g sulfanilamide (0.506 primary aromatic amine equiv.) at 130° C. The ratio of epoxy groups to primary aromatic amine groups was about 3.291:1. The resulting resin advanced to 6.2% epoxide (694 EEW) after 3 hours (10,800 s) theoretical epoxide (7% epoxide theory). This resin had about 0.4 eq. excess sulfamide. Ten grams of the above resin (0.0144 eq., 694 EEW) was blended with 1.7 g of the triglycidyl ether of tris(-hydroxyphenyl)methane (0.011 eq., 162 EEW) and heated to 150° C. To this blend was added 0.02 g of 1-propyl imidazole (~0.2 phr) and the resulting resin mixture was cured at 200° C. for 2 hours (7200 s). The Tg of the resulting cured product was about 200° C.

EXAMPLE 5

A. Resin Preparation 2082 g (11.07 epoxy eq.) of a diglycidyl ether of bisphenol A having an average EEW of 188, 1387 g (4.27 epoxy eq.) of a digylcidyl ether of tetrabromobisphenol A having an average EEW of 325 and 657 g (3.82 primary aromatic amine equiv.) of sulfanilamide were reacted as aforementioned to make an advanced epoxy resin with an average EEW of 522 (540 theory). The ratio of epoxy groups to primary aromatic amine groups was 4.02:1. To this resin was added 1375 g of methyl ethyl ketone to make a transparent homogeneous solution. This solution was then formulated with 847 g of a acetone to lower solution viscosity to 30 seconds (#2 Zahn Cup @ 25° C.). This solution was then spiked with 2.063 g (0.05 phr) of 2-methyl imidazole to improve gel time of resin.

B. Laminate Preparation

Prepegs were prepared by impregnating 7628 "E" type fiberglass (available from Burlington Glass Fabric Company as I-617) with the above formulation and running through a heat zone at 150° C. The resulting prepegs contained about 40% resin and were non-tacky. The prepegs were found to have excellent B-stage properties. Upon pressing 6 12"×12" (304.8 mm×304.8 mm) pieces of prepegs at 175° C. for 1 hour (3600 s) a suitable laminate was made possessing excellent moisture resistance. The laminate withstood a conventional 1 hour (3600 s) pressure cooker test at 15 psi (103 kPa) (steam). The laminate had a glass transition temperature (Tg) of 160° C. The laminate had a Z-axis coefficient of linear expansion of 30.3 ppm (parts per million) at temperatures before its Tg value and 136 ppm at temperatures above its Tg value.

C. Determination of Gel Time and Tg

The resin solution mentioned in A above was mixed with 0.2 phr of ethyltriphenyl phosphonium acetate.acetic acid complex (0.042 g of ethyltriphenyl phosphonium acetate.acetic acid complex, 41.84 g resin solution) and aged for 1 hour (3600 s). The solution was poured onto 170° C. stroke cure-plate and stroked to gel point. The time required at 170° C. to gel the formulation was 240 seconds. The same system without catalyst has a gel time greater than 10 minutes (600 s) at 170° C. The system with tetrabutyl phosphonium acetate.acetic acid complex cured for 2 hours (7200 s) at 175° C. had a Tg of 160° C.

We claim:

1. A resin composition resulting from heating, at a temperature sufficient to cause primarily a reaction between the epoxy groups and the primary aromatic amine groups, but insufficient to cause a significant reaction between the amide groups for a time sufficient to complete the reaction between the aromatic amine groups and the epoxy groups, a composition comprising (A) at least one epoxy resin having an average of more than one 1,2-epoxy group per molecule and (B) at least one amine substituted aromatic sulfonic acid amide; wherein components (A) and (B) are employed in quantities which provide at least about 0.2 1,2-epoxy group for each primary aromatic amine group.

2. A composition of claim 1 wherein
   (1) the temperature employed is not greater than about 130° C. and
   (2) components (A) and (B) are employed in quantities which provides from about 0.5 to about 20 1,2-epoxy groups for each primary aromatic amine group.

3. A composition of claim 2 wherein the temperature employed is not greater than about 120° C.

4. A composition of claims 1, 2 or 3 wherein component (A) is at least one epoxy resin represented by the formulas I, II, III or IV as set forth in the specification or a mixture thereof wherein each A is independently a divalent hydrocarbyl group having from 1 to about 10 carbon atoms

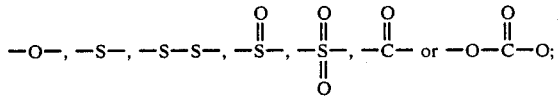

each A' is independently a divalent hydrocarbyl group having from 1 to about 10 carbon atoms; R is hydrogen or a hydrocarbyl group having from 1 to about 10 carbon atoms; each R' is independently hydrogen or a hydrocarbyl group having from 1 to about 4 carbon atoms; each X is independently hydrogen, a monovalent hydrocarbyl group having from 1 to about 10 carbon atoms or a halogen; n has a value of zero or 1; n' has a value of from about 1.01 to about 7; n" has a value of from about one to about 4; x has a value of from one to about 4 and x' has a value of from one to about 3 and wherein component (B) is an amine substituted aromatic sulfonamide represented by formula V as set forth in the specification wherein X and x are as defined above.

5. A composition of claim 4 wherein component (A) is
   (2) an epoxy resin represented by formula III;
   (2) a mixture of epoxy resins represented by formulas II and III; or
   (3) a mixture of epoxy resins represented by formulas III and IV; and component (B) is sulfanilamide.

6. A composition of claim 5 wherein A is an isopropylidene group, A' is a methylene group, R is hydrogen, R' and X are hydrogen, and n, x and x' have a value of 1.

7. A resin composition containing excess epoxy groups with respect to amine hydrogen atoms resulting from heating, at a temperature which is sufficient to cause primarily a reaction between the epoxy groups and the primary aromatic amine group, but insufficient to cause a significant reaction between the epoxy groups and the amide groups, for a time sufficient to complete the reaction between the aromatic amine groups and the epoxy groups, a composition comprising (A) at least one epoxy resin having an average of more than one 1,2-epoxy groups per molecule and (B) at least one amine substituted aromatic sulfonic acid amide; wherein components (A) and (B) are employed in quantities which provide from greater than about 4 to about 20 1,2-epoxy groups for each primary aromatic amine group.

8. A composition of claim 7 wherein
   (1) the temperature employed is not greater than about 130° C. and
   (2) components (A) and (B) are employed in quantities which provides from about 6 to about 16 1,2-epoxy groups for each primary aromatic amine group.

9. A composition of claim 8 wherein
   (1) the temperature employed is not greater than about 120° C. and
   (2) components (A) and (B) are employed in quantities which provides fron about 8 to about 16 1,2-epoxy groups for each primary aromatic amine group.

10. A composition of claims 7, 8 or 9 wherein component (A) is at least one epoxy resin represented by the formulas I, II, III or IV as set forth in the specification or a mixture thereof wherein each A is independently a divalent hydrocarbyl group having from 1 to about 10 carbon atoms,

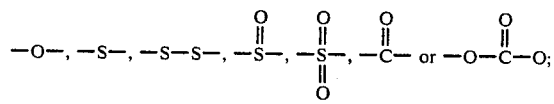

each A' is independently a divalent hydrocarbyl group having from 1 to about 10 carbon atoms; R is hydrogen or a hydrocarbyl group having from 1 to about 10 carbon atoms; each R' is independently hydrogen or a hydrocarbyl group having from 1 to about 4 carbon atoms; each X is independently hydrogen, a monovalent hydrocarbyl group having from 1 to about 10 carbon atoms or a halogen; n has a value of zero or 1; n' has a value of from about 1.01 to about 7; n" has a value of from about one to about 4; x has a value of from one to about 4 and x' has a value of from one to about 3 and wherein component (B) is an amine substituted aromatic sulfonamide represented by formula V as set forth in the specification wherein X and x are as defined above.

11. A composition of claim 10 wherein component (A) is
   (1) an epoxy resin represented by formula III;
   (2) a mixture of epoxy resins represented by formulas II and III; or
   (3) a mixture of epoxy resins represented by formulas III and IV; and wherein component (B) is sulfanilamide.

12. A composition of claim 11 wherein A is an isopropylidene group, A' is a methylene group, R is hydrogen, R' and X are hydrogen, n, x and x' have a value of 1.

13. An article resulting from subjecting a composition comprising (A) a resin of claims 7, 8 or 9 and (B) a curing quantity of at least one curing agent therefor selected from carboxylic acids, carboxylic acid anhydrides and Lewis acids to conditions sufficient to cure the composition.

14. An article of claim 13 which is a structural or electrical laminate or composite.

15. An article resulting from subjecting a composition comprising (A) a resin of claim 10 and (B) a curing quantity of at least one curing agent therefor to conditions sufficient to cure the composition.

16. An article of claim 15 which is a structural or electrical laminate or composite.

17. An article resulting from subjecting a composition comprising (A) a resin of claim 11 and (B) a curing quantity of at least one curing agent therefor to conditions sufficient to cure the composition.

18. An article of claim 17 which is a structural or electrical laminate or composite.

19. An article resulting from subjecting a composition comprising (A) a resin of claim 12 and (B) a curing quantity of at least one curing agent therefor to conditions sufficient to cure the composition.

20. An article of claim 19 which is a structural or electrical laminate or composite.

21. A latent self-curing epoxy resin composition resulting from heating, at a temperature sufficient to cause primarily a reaction between the epoxy groups and the primary aromatic amine groups, but insufficient to cause a significant reaction between the amide groups for a time sufficient to complete the reaction between the aromatic amine groups and the epoxy groups, a composition comprising (A) at least one epoxy resin having an average of more than one 1,2-epoxy group per molecule and (B) at least one amine substituted aromatic sulfonic acid amide; wherein components (A) and (B) are employed in quantities which provide from about 2.5 to about 6 1,2-epoxy group for each primary aromatic amine group.

22. A composition of claim 21 wherein
   (1) the temperature employed is not greater than about 130° C. and
   (2) components (A) and (B) are employed in quantities which provides from about 3 to about 5 1,2-epoxy groups for each primary aromatic amine group.

23. A composition of claim 22 wherein the temperature employed is not greater than about 120° C.

24. A composition of claims 21, 22 or 23 wherein component (A) is at least one epoxy resin represented by the formulas I, II, III or IV as set forth in the specification or a mixture thereof wherein each A is independently a divalent hydrocarbyl group having from 1 to about 10 carbon atoms,

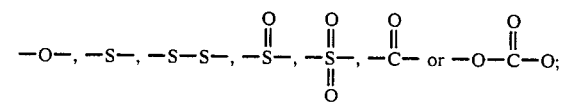

each A' is independently a divalent hydrocarbyl group having from 1 to about 10 carbon atoms; R is hydrogen or a hydrocarbyl group having from 1 to about 10 carbon atoms; each R' is independently hydrogen or a hydrocarbyl group having from 1 to about 4 carbon atoms; each X is independently hydrogen, a monovalent hydrocarbyl group having from 1 to about 10 carbon atoms or a halogen; n has a value of zero or 1; n' has a value of from about 1.01 to about 7; n" has a value of from about one to about 4; x has a value of from one to about 4 and x' has a value of from one to about 3 and wherein component (B) is an amine substituted aromatic sulfonamide represented by formula V as set forth in the specification wherein X and x are as defined above.

25. A composition of claim 24 wherein component (A) is
    (1) an epoxy resin represented by formula III;
    (2) a mixture of epoxy resins represented by formulas II and III; or
    (3) a mixture of epoxy resins represented by formulas III and IV; and wherein component (B) is sulfanilamide.

26. A composition of claim 25 wherein A is an isopropylidene group, A' is a methylene group, R is hydrogen, R' and X are hydrogen, and n, x and x' have a value of 1.

27. A resin composition containing excess hydrogen atoms attached to a nitrogen atom with respect to epoxy groups resulting from heating, at a temperature which is sufficient to cause primarily a reaction between the epoxy groups and the primary aromatic amine group, but insufficient to cause a significant reaction between the epoxy groups and the amide groups, for a time sufficient to complete the reaction between the aromatic amine group and the epoxy groups, a composition comprising (A) at least one epoxy resin having an average of more than one 1,2-epoxy groups per molecule and (B) at least one amine substituted aromatic sulfonic acid amide; wherein components (A) and (B) are employed in quantities which provide from about 0.2 to less than about 4 1,2-epoxy groups for each primary aromatic amine group.

28. A composition of claim 27 wherein
    (1) the temperature employed is not greater than about 130° C. and
    (2) components (A) and (B) are employed in quantities which provides from about 0.3 to about 1.9 or from about 2.1 to about 3.5 1,2-epoxy groups for each primary aromatic amine group.

29. A composition of claim 28 wherein the temperature employed is not greater than about 120° C.

30. A composition of claims 27, 28 or 29 wherein component (A) is an epoxy resin represented by the formulas I, II, III or IV as set forth in the specification or a mixture thereof wherein each A is independently a divalent hydrocarbyl group having from 1 to about 10 carbon atoms,

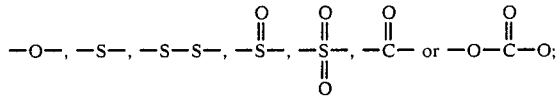

each A' is independently a divalent hydrocarbyl group having from 1 to about 10 carbon atoms; R is hydrogen or a hydrocarbyl group having from 1 to about 10 carbon atoms; each R' is independently hydrogen or a hydrocarbyl group having from 1 to about 4 carbon atoms; each X is independently hydrogen, a monovalent hydrocarbyl group having from 1 to about 10 carbon atoms or a halogen; n has a value of zero or 1; n' has a value of from about 1.01 to about 7; n'' has a value of from about one to about 4; x has a value of from zero to about 4 and x' has a value of from zero to about 3 and wherein component (B) is sulfanilamide.

31. A composition of claim 30 wherein component (A) is
    (1) an epoxy resin represented by formula III;
    (2) a mixture of epoxy resins represented by formulas II and III; or
    (3) a mixture of epoxy resins represented by formulas III and IV; and wherein component (B) is sulfanilamide.

32. A composition of claim 31 wherein A is an isopropylidene group, A' is a methylene group, R is hydrogen, R' and X are hydrogen, and n, x and x' have a value of 1.

* * * * *